United States Patent
Badarlis et al.

(10) Patent No.: US 9,671,266 B2
(45) Date of Patent: Jun. 6, 2017

(54) METHOD FOR THERMALLY DETERMINING MASS FLOW OF A GASEOUS MEDIUM AND THERMAL MASS FLOW METER

(71) Applicant: Endress + Hauser Flowtec AG, Reinach (CH)

(72) Inventors: Anastasios Badarlis, Birsfelden (CH); Tobias Baur, Reinach (CH); Axel Pfau, Aesch (CH); Hanno Schultheis, Lorrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 239 days.

(21) Appl. No.: 14/395,627

(22) PCT Filed: Mar. 19, 2013

(86) PCT No.: PCT/EP2013/055627
§ 371 (c)(1),
(2) Date: Oct. 20, 2014

(87) PCT Pub. No.: WO2013/160018
PCT Pub. Date: Oct. 31, 2013

(65) Prior Publication Data
US 2015/0075277 A1    Mar. 19, 2015

(30) Foreign Application Priority Data

Apr. 23, 2012  (DE) .......... 10 2012 007 880
Jul. 23, 2012  (DE) .......... 10 2012 106 657

(51) Int. Cl.
*G01F 1/68*    (2006.01)
*G01F 1/696*   (2006.01)

(52) U.S. Cl.
CPC ........... *G01F 1/696* (2013.01); *G01F 1/6965* (2013.01)

(58) Field of Classification Search
USPC .............................. 73/204.11, 204.19, 204.3
See application file for complete search history.

(56) References Cited

U.S. PATENT DOCUMENTS 3,085,431 A * 4/1963 Yerman ............ G01F 1/69
                                              73/204.16
5,576,487 A * 11/1996 Gimson ............ G01F 1/684
                                                73/1.16

(Continued)

FOREIGN PATENT DOCUMENTS

DE  102005057688 A1  6/2007
EP     0624242 B1   11/1994
EP     2072981 A2    6/2009

OTHER PUBLICATIONS

Stephan Ihle: "Experimentelle Bestimmung des Recoveryfaktors einer Temperatursonde", May 1, 2009, XP0550747566.

(Continued)

*Primary Examiner* — Clayton E Laballe
*Assistant Examiner* — Warren K Fenwick
(74) *Attorney, Agent, or Firm* — Bacon & Thomas, PLLC

(57) ABSTRACT

A method for determining mass flow of a gas by means of a mass flow meter, which has a first and a second temperature sensor, which can be flowed around by the gas. The first temperature sensor is heated with a heating power Q, wherein the mass flow of the medium is determined by means of a power coefficient PC=Q/ΔT as a function of a heating power Q and a temperature difference $\Delta T_m = T_1 - T_2$ between the measured values of the temperature sensor. A corrected power coefficient $PC_{corr}$ is determined, wherein at least one correction occurs by means of at least one recovery correction term $K_i$, wherein the recovery correction term $K_i$ (Continued)

has the form $K_i = \Delta_x \cdot u^2/(2 \cdot c_p)$, wherein u is the flow velocity and $c_p$ the heat capacity of the medium, $\Delta_x$ is an element of the set $\{\Delta_1; \Delta_2; \Delta_{12}\}$, $\Delta_1 := e_1 - c_r$, $\Delta_2 := e_2 - c_r$ and $\Delta_{12} := e_1 - e_2 = \Delta_1 - \Delta_2$, $e_1$ and $e_2$ are the recovery factors of the first, respectively second, temperature sensors, and wherein $c_r$ is a constant reference value, for which holds $c_r \leq 1$, especially $c_r = 1$.

14 Claims, 2 Drawing Sheets

(56) References Cited

U.S. PATENT DOCUMENTS

| | | | | |
|---|---|---|---|---|
| 7,399,118 B2* | 7/2008 | Matter | ............... | G01F 1/6965 374/31 |
| 8,157,440 B2* | 4/2012 | Kulczyk | ............... | G01K 13/028 374/109 |
| 2010/0138052 A1* | 6/2010 | Popp | ............... | G01F 1/696 700/282 |
| 2010/0139390 A1* | 6/2010 | Gimson | ............... | G01F 1/688 73/204.23 |
| 2012/0029786 A1* | 2/2012 | Calandra | ............... | F01D 25/02 701/100 |
| 2013/0074593 A1* | 3/2013 | Eto | ............... | G01F 1/698 73/204.11 |
| 2015/0068299 A1* | 3/2015 | Zhu | ............... | G01F 1/6845 73/204.23 |

OTHER PUBLICATIONS

German Search Report, German PTO, Munich, Dec. 18, 2012.
International Search Report, EPO, The Netherlands, Aug. 20, 2013.
English Translation of the International Preliminary Report on Patentability, WIPO, Geneva, Mar. 19, 2013.

* cited by examiner

METHOD FOR THERMALLY DETERMINING MASS FLOW OF A GASEOUS MEDIUM AND THERMAL MASS FLOW METER

TECHNICAL FIELD

The present invention relates to a method for thermally determining mass flow of a gaseous medium and a thermal mass flow meter.

BACKGROUND DISCUSSION

Methods for thermally determining mass flow of a gas and corresponding thermal mass flow meters are known per se. They operate by heating a first temperature sensor flowed around by the medium, in order to produce, respectively to maintain, a temperature difference relative to a second temperature sensor flowed around by the medium.

The greater the mass flow, the more heat is transported away by the medium, and the more heating power is required, in order, for example, to maintain a predetermined temperature difference. As a result, the so called power coefficient, thus the ratio between the heating power Q and the achieved temperature difference, is a measure for the mass flow.

For exact determination of the mass flow, the power coefficient is used to ascertain a heat transfer coefficient (htc), based on which then via the Nusselt-, Prandtl- and Reynolds number, the mass flow is determined. Details concerning this are disclosed especially in European patent EP 0 624 242 B1. Offenlegungsschrift (laid open German application) DE 10 2005 057 688 A1 discloses a method for determining mass flow using a Mach number correction.

Both aforementioned documents of the state of the art describe good methods for sufficiently low flow velocities, respectively for symmetric arrangements of temperature sensors.

Especially when asymmetries occur between the temperature sensors at higher flow velocities, the so called recovery effect must be taken into consideration. The recovery effect brings about a warming of the temperature sensor due to stopping of the gas stream on the probe surface. Especially in the case of asymmetric flowmeters, the recovery effect negatively influences the accuracy of measurement considerably. It is, consequently, an object of the present invention to provide a method for thermally determining the mass flow of a gas and to provide a thermal mass flow meter, whereby the recovery effect is corrected.

SUMMARY OF THE INVENTION

The object is achieved according to the invention by a method for determining mass flow of a gaseous medium by means of a thermal mass flow meter, which has at least a first temperature sensor, which can be flowed around by the medium and which has at least a second temperature sensor, which can be flowed around by the medium. The first temperature sensor is spaced from the second temperature sensor, and the first temperature sensor is heated with a heating power Q, wherein heat transfer from the first temperature sensor into the medium depends on the mass flow of the medium. The mass flow of the medium is determined by means of a power coefficient $PC=Q/\Delta T$ as a function of a heating power Q and a temperature difference $\Delta T_m = T_1 - T_2$ between the measured values of the first temperature sensor and the second temperature sensor, characterized in that a corrected power coefficient $PC_{corr}$ is determined from corrected values of the temperature difference $\Delta T$, wherein at least one correction occurs by means of at least one recovery correction term $K_i$.

In a further development of the invention, the recovery correction term $K_i$ has the form $K_i = \Delta_x \cdot u^2/(2 \cdot c_p)$, wherein u is a value for the flow velocity of the medium, wherein $c_p$ is a value for the heat capacity of the medium, wherein $\Delta_x$ is an element of the set $\{\Delta_1; \Delta_2; \Delta_{12}\}$, wherein $\Delta_1 := e_1 - c_r$, $\Delta_2 := e_2 - c_r$ and $\Delta_{12} := e_1 - e_2 = \Delta_1 - \Delta_2$, wherein $e_1$ and $e_2$ are the recovery factors of the first, respectively second, temperature sensor, and wherein $c_r$ is a constant reference value, wherein $c_r \leq 1$, especially $c_r = 1$.

In a further development of the invention, the recovery correction term $K_i$ is subtracted from a temperature difference $\Delta T$ or added to the temperature difference $\Delta T$, in order to obtain a corrected temperature difference $\Delta T_{corr}$, which enters as divisor, respectively factor, into the determining of a corrected power coefficient $PC_{corr}$.

In a further development of the invention, the divisor $D_i$, respectively the factor $F_i$, is normalized with the temperature difference $\Delta T$, so that the divisor $D_i$, respectively factor $F_i$, has the form $[1 \pm (K_i/\Delta T)]$.

In a further development of the invention, the first and second temperature sensors have different recovery factors $e_1$, $e_2$, wherein, especially, the first and second temperature sensors have different flow effective forms.

In a further development of the invention, at least a first corrected temperature difference $\Delta T_{corr\_1}$ is ascertained by subtracting from the measured temperature difference $\Delta T_m$ a correction term $K_1 = \Delta_{12} \cdot u^2/(2 \cdot c_p)$, thus $\Delta T_{corr\_1} := \Delta T_m - K_1 = \Delta T_m - \Delta_{12} \cdot u^2/(2 \cdot c_p)$.

In a further development of the invention, by means of the first corrected temperature difference, a first corrected power coefficient is ascertained, wherein especially the following holds: $PC_{corr\_1} = Q/\Delta T_{corr\_1}$.

In a further development of the invention, at least a second corrected temperature difference $\Delta T_{corr\_2}$ is ascertained by subtracting from a temperature difference $\Delta T$ a correction term K2, respectively adding to a temperature difference $\Delta T$ a correction term K2, in which only one of the recovery factors enters, wherein $K_2 = \Delta_1 \cdot u^2/(2 \cdot c_p)$ and $\Delta T_{corr\_2} = \Delta T + K_2$.

In a further development of the invention, based on the correction term K2 dependent on only one recovery factor and added to the first corrected temperature difference $\Delta T_{corr\_1}$, a second corrected temperature difference $\Delta T_{corr\_2}$ is ascertained, with which based on the first corrected power coefficient a second corrected power coefficient is determined: $PC_{corr\_2} = PC_{corr\_1}/(1 + K_2/\Delta T_{corr\_1})$.

In a further development of the invention, the value for the flow velocity is derived from a value for the mass flow as well as from values for the pressure and the temperature of the medium, wherein the pressure value is provided as a measured value or is predetermined.

In a further development of the invention, based on the corrected power coefficient, a heat transfer coefficient (htc) is ascertained, wherein based on the corrected ascertained heat transfer coefficient (htc), current values for the Nusselt number (Nu) and the Prandtl number (Pr) are determined, with whose help a current value for the Reynolds number (Re) is ascertained, wherein, based on the Reynolds number, values for the mass flow and the flow velocity are ascertained.

In a further development of the invention, a renewed correction for the recovery effect is obtained with the ascertained value for the flow velocity, wherein with the resulting power coefficient a renewed ascertaining of mass flow and flow velocity is performed, and wherein the method is repeated iteratively, until the values for mass flow and flow velocity sufficiently converge, in order to satisfy a given requirement and accuracy of measurement.

The flow meter of the invention for thermally determining the mass flow of a gas in a line, especially according to one of the above methods, includes at least a first temperature sensor, which can be flowed around by the medium; at least a second temperature sensor, which can be flowed around by the medium; wherein the first temperature sensor is spaced from the second temperature sensor, wherein the first temperature sensor has a heating element; wherein the flow meter further includes an operating and evaluating circuit, in order to feed the heating element with a power Q, to register the temperatures of the first temperature sensor and the second temperature sensor T1, T2, based on the power and a difference $\Delta T$ between the measured temperatures $T_1$, $T_2$ to ascertain a power coefficient, from the power coefficient to ascertain a heat transfer coefficient (htc), wherein based on the ascertained heat transfer coefficient (htc) current values for the Nusselt number (Nu), and the Prandtl number (Pr) are determined, with whose help a current value for the Reynolds number (Re) is ascertained, wherein based on the Reynolds number value the mass flow and the flow velocity are ascertained, characterized in that the operating and evaluating circuit is adapted to ascertain a power coefficient $PC_{korr}$, which is corrected as regards the recovery effect.

In a further development of the invention, the operating and evaluating circuit includes a microprocessor and at least one data memory, in which the at least one recovery factor or a difference between two recovery factors is stored.

In a further development of the invention, the first and second temperature sensors have different flow effective forms.

In a further development of the invention, the operating and evaluating circuit includes at least one data memory, in which relationships between the heat transfer coefficient (htc) and the Nusselt number (Nu), respectively between the Nusselt number (Nu), the Prandtl number (Pr) and the Reynolds number (Re), are stored tabularly and/or functionally.

BRIEF DESCRIPTION OF THE DRAWINGS

The invention will now be described in greater detail based on the example of an embodiment illustrated in the drawing, the figures of which show as follows.

DETAILED DISCUSSION IN CONJUNCTION WITH THE DRAWINGS

Figure 1:
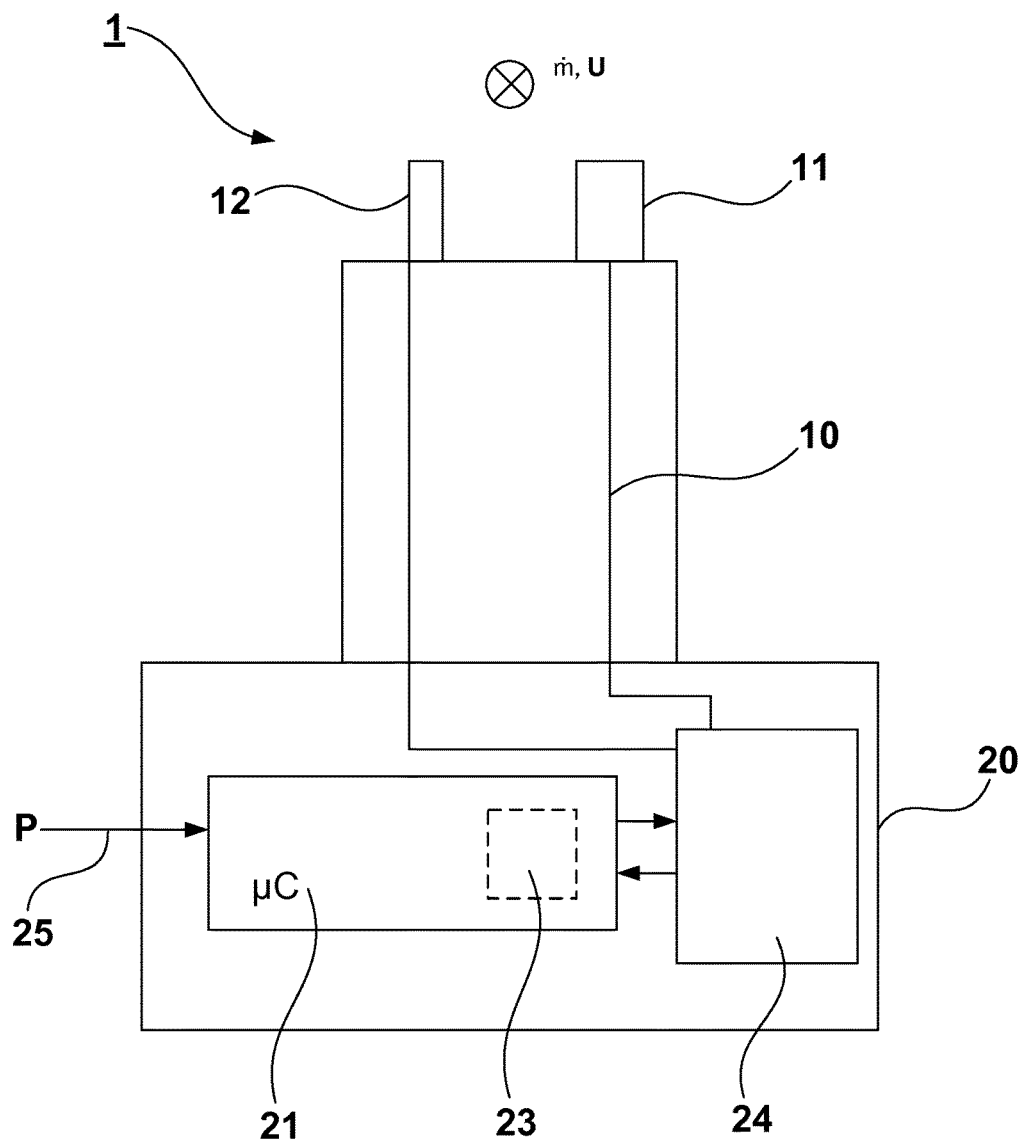
FIG. 1 is a schematic representation of an example of an embodiment of a flowmeter of the invention.

The thermal flowmeter 1 shown in FIG. 1 includes a cylindrical support tube 10 as well as a first temperature sensor 11 and a second temperature sensor 12, each of which protrudes from an end face of the support tube 10. Each of the temperature sensors comprises a metal shell of length of, for instance, 1 cm, in which a resistance thermometer is arranged. The first temperature sensor 11 can additionally be heated via an electrical resistance in the shell. The shell of the first temperature sensor 11 has an outer diameter of, for instance, 6 mm, while the outer diameter of the second temperature sensor amounts to, for instance, 3 mm.

The flow meter further includes an electronics module 20 with a microcontroller 21, which contains a data memory 23, as well as an operating and measuring circuit 24 for heating the first temperature sensor 11 and for measuring the temperatures $T_1$ and $T_2$ of the first and second temperature sensors 11, 12, wherein the operating and measuring circuit 24 is controlled by the microcontroller.

Fundamentally, the thermal ascertaining of a mass flow occurs by supplying the first temperature sensor with a heating power Q, which is so controlled that the difference between the temperatures $T_1$ and $T_2$ of the two temperature sensors corresponds to a desired value. From the power coefficient resulting therefrom, then a heat transfer coefficient htc is ascertained, based on which then via ascertaining of the Nusselt number (Nu), and the relationship between the Nusselt number (Nu), the Prandtl number (Pr) and the Reynolds number (Re), the mass flow and the velocity are ascertained. This method is described in European Patent EP 0 624 242 B1 and is used for putting the present invention into practice. The required relationships between PC, htc, Nu, Pr and Re are stored tabularly and/or functionally in the data memory 23, respectively furnished in an additional data memory.

According to the invention, there occurs supplementally at least one correction for the recovery effect. The basis for this is knowledge of the recovery factors $e_1$, $e_2$ and the difference between the recovery factors $\Delta_{12}=e_1-e_2$.

The difference between the recovery factors $\Delta_{12}=e_1-e_2$ can be determined, for example, by exposing an unheated thermal flowmeter with a heating power of Q=0 to a defined mass flow of a gas under different velocities u. From the resulting temperature differences $\Delta T=T_1-T_2=\Delta_{12}\cdot u^2/(2\cdot c_p)$, $\Delta_{12}$ can be determined, without having to know the individual values of the recovery factors $e_1$, $e_2$.

The determining of a recovery factor of a temperature sensor can basically occur by flowing a defined mass flow of a gas of known temperature and different flow velocities around it or by difference measurement against another temperature sensor with known recovery factor. A method for determining a recovery factor of a temperature probe is disclosed by Stephan Ihle in his bachelor thesis at the Technical University Wien bearing the title "Experimentally Determining the Recovery Factor of a Temperature Probe".

The ascertained values of $\Delta_{12}\Delta_1$ are stored in the data memory 23 and are available there for evaluation purposes.

In the case of the mentioned geometries, the recovery factors of both temperature sensors lie between 0.9 and 1, wherein the recovery factor of the first temperature sensor is usually the smaller of the two.

Furthermore, the data memory contains at least one value for the heat capacity $c_p$ of a gas whose mass flow is to be measured.

A further essential parameter is the pressure, with which the gas is flowing past the temperature sensors, for therefrom depends in the case of given mass flow the flow velocity.

In arrangements with constant pressure, the pressure can be predetermined and stored as a fixed parameter. In the case of arrangements with fluctuating gas pressure, in contrast, a pressure measurement value of an external pressure sensor is supplied via a signal input 25, to the extent that the flow meter has no integrated pressure meter.

Figure 2:
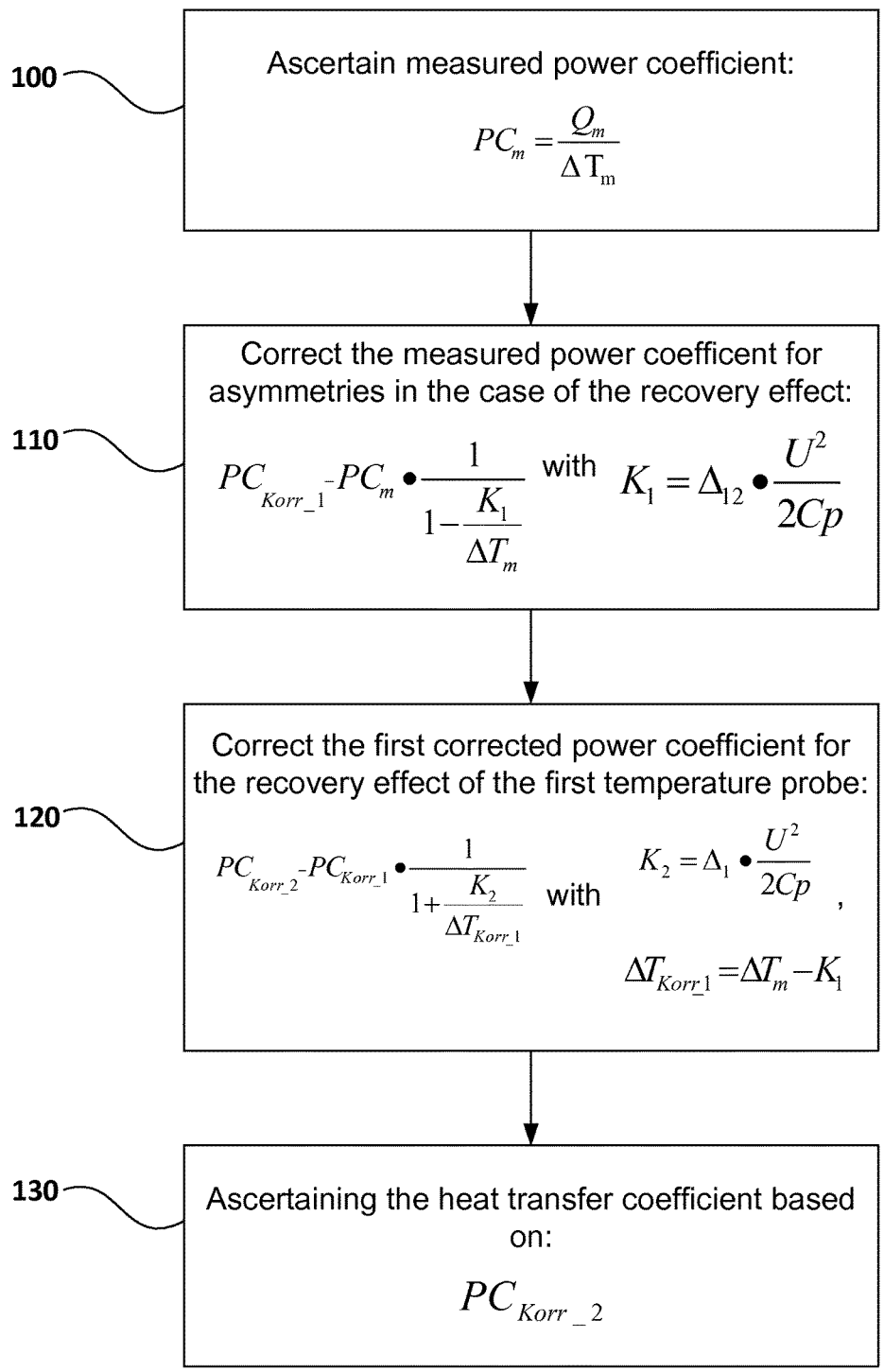
FIG. 2 is a flow diagram for correction of errors due to the recovery effect.

FIG. 2 gives an overview of an example of an embodiment for correction for the recovery effect.

In step 100, first of all, conventionally a power coefficient $PC_m$ is determined based on the measured values for the power Q and the temperature difference $\Delta T$.

Then, there follows in step 110 a correction for asymmetry in the recovery factors.

In step 120, then a second correction is performed, in order to compensate for the recovery effect of the first temperature sensor per se.

In step 130, there occurs, finally, the ascertaining of the heat transfer coefficient htc from the power coefficient corrected for the recovery effect. This step and the following steps for ascertaining the mass flow and the flow velocity occur according to the state of the art.

In step 110, the flow velocity is explored as a parameter. In such case, usually, a comparatively current value, for example, the last available measured value, is used as starting value for the correction in an iterative method, in the case of which the correction for the recovery effect is performed anew with the flow velocity ascertained at the end of a trial, until the resulting values for mass flow and flow velocity become sufficiently stable, in order to satisfy a predetermined criterion for the accuracy of measurement, for example, $(u_n-u_{n-1})/u_n < 3\%$, especially $<1\%$, and preferably $<0.5\%$.

The invention claimed is:

1. A method for determining the mass flow of a gaseous medium by means of a thermal mass flow meter, said mass flow meter has at least a first temperature sensor, which can be flowed around by the medium, and has at least a second temperature sensor, which can be flowed around by the medium, comprising the steps of:
   spacing the first temperature sensor from the second temperature sensor;
   heating the first temperature sensor with a heating power Q, wherein heat transfer from the first temperature sensor into the medium depends on mass flow of the medium;
   determining the mass flow of the medium by means of a power coefficient $PC=Q/\Delta T$ as a function of a heating power Q and a temperature difference $\Delta T_m = T_1 - T_2$ between the measured values of the first temperature sensor and the second temperature sensor; and
   determining a corrected power coefficient $PC_{corr}$ from corrected values of the temperature difference $\Delta T$, wherein:
   at least one correction occurs by means of at least one recovery correction term $K_i$;
   the recovery correction term $K_i$ has the form $K_i = \Delta_x \cdot u^2/(2 \cdot c_p)$;
   u is a value for the flow velocity of the medium;
   $c_p$ is a value for the heat capacity of the medium;
   $\Delta_x$ is an element of the set $\{\Delta_1; \Delta_2; \Delta_{12}\}$;
   $\Delta_1 := e_1 - c_r$, $\Delta_2 := e_2 - c_r$ and $\Delta_{12} := e_1 - e_2 = \Delta_1 - \Delta_2$,
   $e_1$ and $e_2$ are the recovery factors of the first, respectively second temperature sensor; and
   $c_r$ is a constant reference value, wherein $c_r \leq 1$, especially $c_r = 1$.

2. The method as claimed in claim 1, wherein:
   the recovery correction term K is subtracted from a temperature difference $\Delta T$ or added to the temperature difference $\Delta T$, in order to obtain a corrected temperature difference $\Delta T_{corr}$, which enters as divisor, respectively factor, into the determining of a corrected power coefficient $PC_{corr}$.

3. The method as claimed in claim 2, wherein:
   the divisor $D_i$, respectively factor $F_i$, is normalized with the temperature difference $\Delta T$, so that the divisor $D_i$, respectively factor $F_i$, has the form $[1 \pm (K_i/\Delta T)]$.

4. The method as claimed in claim 1, wherein:
   the first and second temperature sensors have different recovery factors $e_1$, $e_2$, and, especially, the first and second temperature sensors have different flow effective forms.

5. The method as claimed in claim 1, wherein:
   at least a first corrected temperature difference $\Delta T_{corr\_1}$ is ascertained by subtracting from the measured temperature difference $\Delta T_m$ a correction term $K_1 = \Delta_{12} \cdot u^2/(2 \cdot c_p)$, thus $\Delta T_{corr\_1} := \Delta T_m - K_1 = \Delta T_m - \Delta_{12} \cdot u^2/(2 \cdot c_p)$.

6. The method as claimed in claim 5, wherein:
   by means of the first corrected temperature difference, a first corrected power coefficient is ascertained:

$PC_{corr\_1} = Q/\Delta T_{corr\_1}$.

7. The method as claimed in claim 6, wherein:
   based on the correction term $K_2$ dependent on only one recovery factor and added to the first corrected temperature difference $\Delta T_{corr\_1}$, a second corrected temperature difference $\Delta T_{corr\_2}$ is ascertained, with which based on the first corrected power coefficient a second corrected power coefficient is determined:

$PC_{corr\_2} = PC_{corr\_1}/(1 + K_2/\Delta T_{corr\_1})$.

8. The method as claimed in claim 1, wherein:
   at least a second corrected temperature difference $\Delta T_{corr\_2}$ is ascertained by subtracting from a temperature difference $\Delta T$ a correction term $K_2$, respectively adding to a temperature difference $\Delta T$ a correction term $K_2$, in which only one of the recovery factors enters; and $K_2 = \Delta_1 \cdot u^2/(2 \cdot c_p)$ and $\Delta T_{corr\_2} = \Delta T + K_2$.

9. The method as claimed in claim 1, wherein:
   the value for the flow velocity is derived from a value for the mass flow as well as from values for the pressure and the temperature of the medium, wherein the pressure value is provided as a measured value or is predetermined.

10. The method as claimed in claim 1, wherein:
    based on the corrected power coefficient, a heat transfer coefficient (htc) is ascertained;
    based on the corrected ascertained heat transfer coefficient (htc), current values for the Nusselt number (Nu), and the Prandtl number (Pr) are determined, with whose help a current value of the Reynolds number (Re) is ascertained; and
    based on the Reynolds number, values for the mass flow and the flow velocity are ascertained.

11. The method as claimed in claim 10, wherein:
    a renewed correction for the recovery effect is obtained with the ascertained value for the flow velocity, with the resulting power coefficient a renewed ascertaining of mass flow and flow velocity is performed; and
    the method is repeated iteratively, until the values for mass flow and flow velocity sufficiently converge, in order to satisfy a given requirement and accuracy of measurement.

12. A flow meter for thermally determining the mass flow of a gas in a line, especially according to a method as claimed in claim 1, comprising:
    at least a first temperature sensor, which can be flowed around by the medium;
    at least a second temperature sensor, which can be flowed around by the medium; and
    a heating element; and an operating and evaluating circuit, in order to feed said heating element with a power Q, to register the temperatures of said first temperature sensor and said second temperature sensor T1, T2, wherein:

said first temperature sensor is spaced from said second temperature sensor;

based on the power and a difference ΔT between the measured temperatures $T_1$, $T_2$ to ascertain a power coefficient, from the power coefficient to ascertain a heat transfer coefficient (htc);

based on the ascertained heat transfer coefficient (htc) current values for the Nusselt number (Nu), and the Prandtl number (Pr) are determined, with whose help a current value for the Reynolds number (Re) is ascertained;

based on the Reynolds number value the mass flow and the flow velocity are ascertained; and said operating and evaluating circuit is adapted to ascertain a power coefficient $PC_{korr}$, which is corrected as regards the recovery effect.

13. The flow meter as claimed in claim 12, wherein:
said operating and evaluating circuit includes a microprocessor and at least one data memory, in which the at least one recovery factor or a difference between two recovery factors is stored, and/or in which the relationships between the heat transfer coefficient (htc) and the Nusselt number (Nu), respectively between the Nusselt number (Nu), the Prandtl number (Pr) and the Reynolds number (Re), are stored tabularlly and/or functionally.

14. The flow meter as claimed in claim 12, wherein:
said first and second temperature sensors have different flow effective forms.

\* \* \* \* \*